United States Patent Office 2,906,050
Patented Sept. 29, 1959

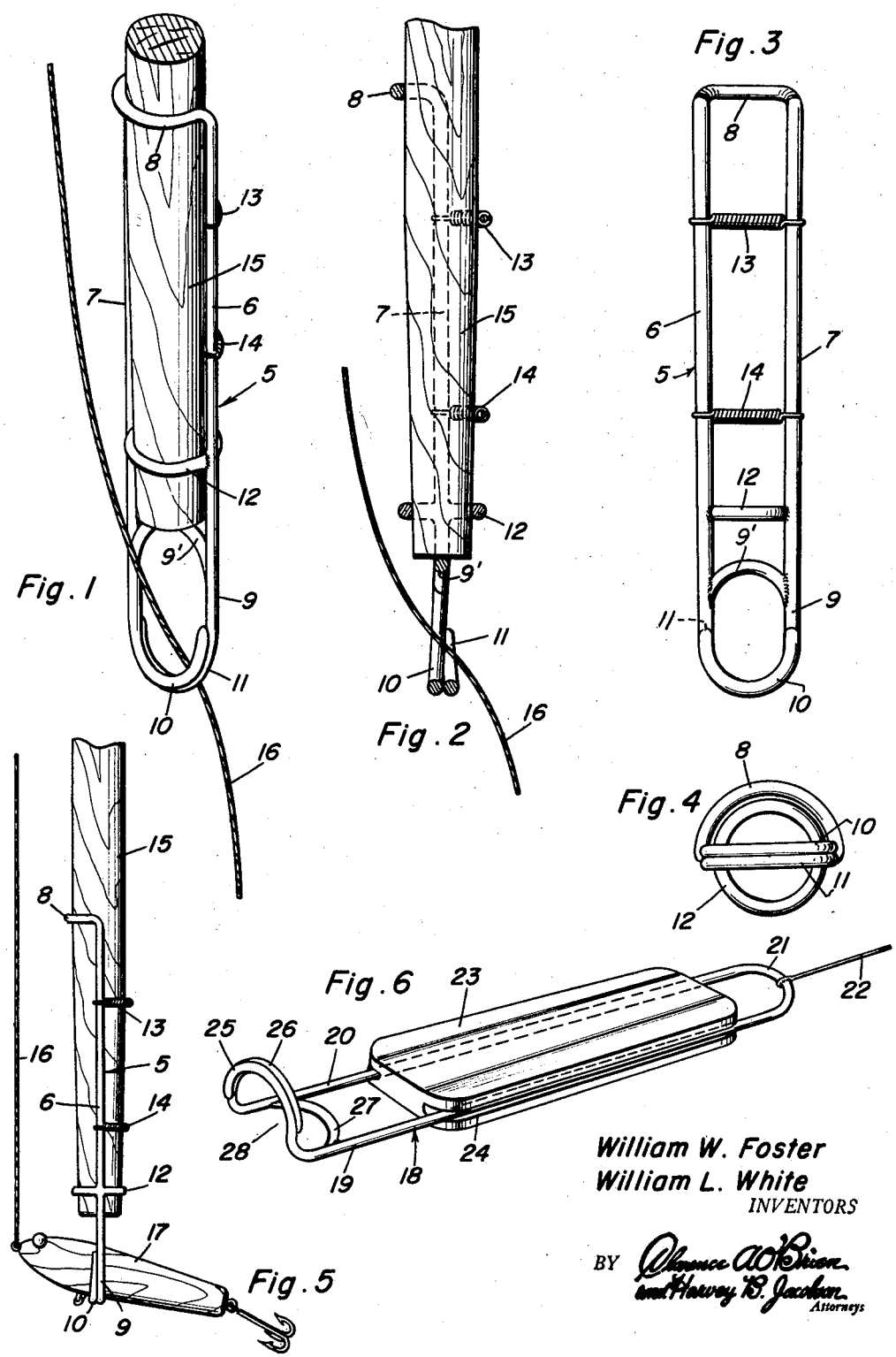

2,906,050
FISHING LURE RETRIEVER

William W. Foster, Decatur, Ala., and William L. White, Atlanta, Ga.

Application October 20, 1955, Serial No. 541,665

2 Claims. (Cl. 43—17.2)

The present invention relates to new and useful improvements in devices for freeing and retrieving fishing hooks or lures from submerged objects with which the same has become fouled.

An important object of the invention is to provide a fishing line retriever adapted for easily and quickly placing on a fishing line for sliding thereon to engage and free a snagged hook.

Another object is to provide a fish hook retriever which is adapted to be lowered into the water by either a pole or by a flexible member such as a length of wire or cord, to a position for contacting and freeing and then retrieving a fouled hook.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Fig. 1 is a perspective view of the improved fishing lure retriever showing the lower end portion of a fishing line threaded through an eye located at the lower end of a handle or pole.

Fig. 2 is a central longitudinal sectional view of Fig. 1, with the pole appearing in elevation.

Fig. 3 is a view in elevation of the retriever frame with the handle or pole omitted.

Fig. 4 is a bottom or end view of the frame seen in Fig. 3.

Fig. 5 is a view in side elevation, on a smaller scale, and showing how a plug or lure may be embraced by the aforementioned eye for retrieving.

Fig. 6 is a perspective view of a modified form of the retriever.

Referring now to the drawing in detail, the invention as illustrated in Figures 1 to 5, inclusive, comprises a rigid elongated metal frame member 5 which includes a pair of spaced apart rods or frame members 6 and 7 connected to each other at their rear ends by a semi-circular cross bar 8 which is offset toward one side of the rods and with the lower end of said rods converging slightly toward each other as shown in Fig. 3.

An eye 9 is integrally formed with or otherwise suitably secured to the lower ends of the rods in edgewise longitudinal alignment with the rods to position the axis of the eye between and at right angles to the rods and the front portion of the eye is constructed of resilient, split overlapping arcuate fingers 10 and 11.

A ring 12 is welded or otherwise suitably secured to the inner sides of the rods adjacent the rear portion of eye 9 and with the ring having its axis aligned with the center line of the frame 5 as well as with the center of the semi-circular cross bar 8. One or more coil springs 13 and 14 are soldered or otherwise suitably secured at their end portions to the respective rods 6 and 7 in a transverse position between said rods.

The frame member 5 is placed on the slightly tapering front end of a pole 15 and abuts the upper portion of pole inserted in the ring 12 and abuts the upper portion 9' of eye 9 and with the coil springs 13 and 14 frictionally engaging the pole at diametrically opposite sides of the latter to the semi-circular cross bar 8. A fishing line 16 of a snagged lure or plug 17 is then forced between the resilient fingers 10 and 11 of the eye 9 to enter the line in the eye and the eye is then moved downwardly on the line until the lure or plug is reached which is then partly pulled into the eye, as shown in Figure 5. The pole 15 may then be manipulated to free the hooks of the lure from a submerged object to retrieve the lure.

In the modified construction shown in Figure 6, the retriever comprises a rigid metal frame member 18 formed with a pair of spaced apart parallel rods 19 and 20 united at their rear ends by a curved cross bar 21 to which a retrieving cord or wire 22 is attached. A weighted body 23 is formed at its opposite side edges with grooves 24 in which the rods 19 and 20 are slidably engaged.

The front ends of the rods are provided with semi-circular resilient arcuate overlapping fingers 25 and 26 which are offset laterally toward one side of the rods and between which a fishing line (not shown) is adapted for insertion to slide the retriever downwardly on the line. An arcuate cross bar 27 is welded to the rods 19 and 20 at a point immediately rearwardly of the fingers 25 and 26 to provide an anvil for limiting forward sliding movement of the weight. The fingers 25 and 26 are spaced from the anvil 27 to form an eye 28 into which the snagged hook or line is partly pulled and by alternately pulling and releasing the retrieving cord 22 the weight will slide on the rods 19 and 20 to deliver a hammer blow on anvil 27 to free the snagged hook.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in retrieving a fishing lure or a hook which has become fouled; a retriever comprising an elongated pole providing a reach handle, an elongated frame embodying a pair of coplanar spaced parallel longitudinal frame members, means carried by the upper ends of said frame members and embracing the adjacent portion of the pole, the lower end portions of said frame members being provided with an eye through and beyond which a portion of a fishing line may be slidingly threaded, the upper end portion of said eye abutting an adjacent lower end portion of said pole, a ring having diametrically opposite portions fixedly mounted between the frame members, said ring being spaced above said eye and being in a plane at right angles to the longitudinal axes of the frame members and wholly embracing and co-operatively retaining the lower end portion of said pole, and transversely disposed longitudinally spaced coil springs having their end portions secured to the respective frame members and having their major portions yieldingly embracing cooperating portions of said pole.

2. The structure defined in claim 1 and wherein said eye at the lower end thereof embodies resilient split over-lapping arcuate fingers which serve to facilitate passing a portion of the fishing line between the fingers and locating it for sliding cooperation in the eye proper, the means at the upper ends of said frame members comprising a semi-circular cross-bar which partially embraces a half portion of the pole and which is offset and at right angles to said frame members.

References Cited in the file of this patent

UNITED STATES PATENTS

| | | |
|---|---|---|
| 1,024,968 | Beglinger | Apr. 30, 1912 |
| 1,692,325 | Bellile et al. | Nov. 20, 1928 |
| 1,988,160 | Butte | Jan. 15, 1935 |
| 2,558,768 | McCormick | July 3, 1951 |
| 2,634,539 | Brown et al. | Apr. 14, 1953 |
| 2,722,077 | Newman | Nov. 1, 1955 |
| 2,768,462 | Younce | Oct. 30, 1956 |